United States Patent
Bosveld

(10) Patent No.: US 11,407,178 B2
(45) Date of Patent: Aug. 9, 2022

(54) PRESSURE SENSING IN AN ADDITIVE MANUFACTURING SYSTEM

(71) Applicant: Stratasys, Inc., Eden Prairie, MN (US)

(72) Inventor: Michael D. Bosveld, Bloomington, MN (US)

(73) Assignee: Stratasys, Inc., Eden Prairie, MN (US)

( * ) Notice: Subject to any disclaimer, the term of this patent is extended or adjusted under 35 U.S.C. 154(b) by 457 days.

(21) Appl. No.: 16/327,567

(22) PCT Filed: Sep. 12, 2016

(86) PCT No.: PCT/US2016/051303
§ 371 (c)(1),
(2) Date: Feb. 22, 2019

(87) PCT Pub. No.: WO2018/038750
PCT Pub. Date: Mar. 1, 2018

(65) Prior Publication Data
US 2019/0232566 A1  Aug. 1, 2019

Related U.S. Application Data

(60) Provisional application No. 62/378,489, filed on Aug. 23, 2016.

(51) Int. Cl.
*B29C 64/393* (2017.01)
*B33Y 10/00* (2015.01)
(Continued)

(52) U.S. Cl.
CPC .......... *B29C 64/393* (2017.08); *B29C 64/118* (2017.08); *B29C 64/209* (2017.08);
(Continued)

(58) Field of Classification Search
CPC ... B29C 64/393; B29C 64/118; B29C 64/209; B29C 2948/92028; B29C 2948/92104;
(Continued)

(56) References Cited

U.S. PATENT DOCUMENTS 5,733,319 A  *  3/1998  Neilson .................. A61B 18/18
606/22
5,900,207 A       5/1999  Danforth et al.
(Continued)

FOREIGN PATENT DOCUMENTS

CN   104669623 A    6/2015
JP     5920859 B2   2/2014
(Continued)

OTHER PUBLICATIONS

International Search Report and Written Opinion dated May 19, 2017 for corresponding International Application No. PCT/US2016/051303, filed Sep. 12, 2016.
(Continued)

*Primary Examiner* — Thomas C Lee
*Assistant Examiner* — Ameir Myers
(74) *Attorney, Agent, or Firm* — Peter J. Ims; Westman, Champlin & Koehler, P.A.

(57) ABSTRACT

An additive manufacturing system includes an extruder that includes a drive mechanism, a nozzle, and a pressure sensor. The drive mechanism is configured to feed a molten consumable material. The nozzle is attached at a distal end of the extruder and includes a nozzle tip, through which the molten consumable material is discharged as an extrudate. A pressure interface is fluidically coupled to an interior cavity of the nozzle. The pressure sensor is configured to operably measure a pressure within the interior cavity of the nozzle through the pressure interface.

19 Claims, 4 Drawing Sheets

(51) Int. Cl.
  *B29C 64/118* (2017.01)
  *B29C 64/209* (2017.01)
  *B33Y 30/00* (2015.01)
  *B33Y 50/02* (2015.01)

(52) U.S. Cl.
  CPC ............... *B33Y 10/00* (2014.12); *B33Y 30/00* (2014.12); *B33Y 50/02* (2014.12)

(58) Field of Classification Search
  CPC .......... B29C 2948/92409; B33Y 10/00; B33Y 30/00; B33Y 50/02
  See application file for complete search history.

(56) References Cited

U.S. PATENT DOCUMENTS

| | | | |
|---|---|---|---|
| 6,004,124 | A | 12/1999 | Swanson et al. |
| 6,398,329 | B1* | 6/2002 | Boyd .................. B41J 2/14153 347/7 |
| 7,891,964 | B2 | 2/2011 | Skubic et al. |
| 8,955,558 | B2 | 2/2015 | Bosveld et al. |
| 2009/0241650 | A1* | 10/2009 | Kondo .................. F02M 61/14 73/114.43 |
| 2012/0070523 | A1 | 3/2012 | Swanson et al. |
| 2014/0048969 | A1 | 2/2014 | Swanson et al. |
| 2014/0113527 | A1* | 4/2014 | Lindsay ................ B23K 26/21 451/5 |
| 2015/0097307 | A1 | 4/2015 | Batchelder et al. |
| 2015/0097308 | A1 | 4/2015 | Batchelder et al. |
| 2016/0075089 | A1 | 3/2016 | Royo et al. |
| 2016/0116361 | A1* | 4/2016 | Debeurre .............. G01L 27/005 73/1.58 |
| 2016/0193621 | A1* | 7/2016 | Mori ........................ B05D 1/02 427/427.2 |
| 2016/0198576 | A1* | 7/2016 | Lewis ..................... H01L 24/75 361/761 |
| 2016/0370246 | A1* | 12/2016 | Russell ............... G01L 19/0084 |
| 2017/0036228 | A1* | 2/2017 | Thurow ............... A01C 23/007 |
| 2017/0052531 | A1 | 2/2017 | Minardi et al. |
| 2018/0200955 | A1* | 7/2018 | Hoelldorfer .......... B29C 64/118 |

FOREIGN PATENT DOCUMENTS

| | | |
|---|---|---|
| JP | 5920859 B2 | 5/2016 |
| WO | 2015050958 A2 | 4/2015 |
| WO | 2016014543 A1 | 1/2016 |

OTHER PUBLICATIONS

Second Office Action for Chinese Patent Application No. 201690001746.7, dated Jan. 8, 2020, 2 pages.
Notification of Allowance for Chinese Patent Application No. 201690001746.7, dated Mar. 20, 2020, 2 pages.
Communication pursuant to Rules 161(1) and 162 EPC for European Patent Application No. 16778509.6, dated Mar. 29, 2019, 3 pages.
Chinese Office Action, 201690001746.7, dated Sep. 26, 2019, 5 pages.
Communication pursuant to Article 94(3) EPC from corresponding European Patent Application No. 16778509.6, dated Feb. 15, 2021.
Chinese Office Action from CN Application No. 201690001741.4, dated Sep. 17, 2019; 4 pages.
International Search Report and Written Opinion dated May 24, 2017 for International Application No. PCT/US2016/051316, filed Sep. 12, 2016.

* cited by examiner

PRESSURE SENSING IN AN ADDITIVE MANUFACTURING SYSTEM

CROSS-REFERENCE TO RELATED APPLICATION

This Application is a Section 371 National Stage Application of International Application No. PCT/US2016/051303, filed Sep. 12, 2016 and published as WO/2018/038750 on Mar. 1, 2018, in English, which claims the benefit of U.S. Provisional Patent Application Ser. No. 62/378,489, filed on Aug. 23, 2016, the contents of which are hereby incorporated by reference in their entirety.

BACKGROUND

In extrusion-based additive manufacturing, parts are printed layer-by-layer with each layer extruded onto a previously deposited layer. The extruded layer is forced out of a nozzle in a print head by an extruder that can take the form of a liquefier pump, a gear pump, a screw pump, or a combination of these pumps.

In gear pump extruders, molten material is pumped out of the nozzle by the action of two intermeshing gears. The gears are driven by an actuator that causes the teeth of the intermeshing gears to rotate and thereby transport molten material from one side of the gears to the other side. The rate at which the actuator turns the gears controls the rate at which molten material is extruded.

In screw pumps, molten material is transported by the rotation of a screw that is driven by an actuator. As the screw rotates, threads of the screw impart an axial force to the molten material that causes the molten material to move down the threads toward the nozzle. The rate at which the actuator turns the screw controls the rate at which the molten material is extruded.

In liquefier or viscosity pumps, a solid consumable material is driven into a liquefier tube that melts the consumable material. A pool of the molten consumable material forms in the liquefier tube downstream of the solid consumable material. The solid consumable material operates as a piston to discharge the molten consumable material through a nozzle as it is fed into the liquefier tube and melted.

SUMMARY

Aspects of the present disclosure are directed to an additive manufacturing system and method for printing three-dimensional parts in a layer-by-layer manner. Some embodiments of the additive manufacturing system include an extruder that includes a drive mechanism, a nozzle, and a pressure sensor. The drive mechanism is configured to feed a molten consumable material. The nozzle is attached at a distal end of the extruder and includes a nozzle tip, through which the molten consumable material is discharged as an extrudate. A pressure interface is fluidically coupled to an interior cavity of the nozzle. The pressure sensor is configured to operably measure a pressure within the interior cavity of the nozzle through the pressure interface.

In some aspects of the method for printing a three-dimensional part with an additive manufacturing system, a consumable material is heated to a molten state and fed through an extruder. An interior cavity of an extruder nozzle is filled with the molten consumable material, which is discharged as an extrudate through a nozzle tip of the nozzle in response to feeding the molten consumable material. The interior cavity of the nozzle is fluidically coupled to a pressure interface through a port. A pressure within the interior cavity of the nozzle is operably measured through the pressure interface using a pressure sensor.

Definitions

Unless otherwise specified, the following terms as used herein have the meanings provided below:

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

The term "operably measure" and the like refers to a measurement that may be a direct measurement and/or an indirect measurement. For example, operably measuring pressure within a liquefier assembly, such as within a nozzle or a liquefier tube, may be performed by directly measuring the pressure within the liquefier assembly.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The terms "about" and "substantially" are used herein with respect to measurable values and ranges due to expected variations known to those skilled in the art (e.g., limitations and variabilities in measurements).

DETAILED DESCRIPTION

Embodiments of the present disclosure are directed to sensing a pressure of molten consumable material within an extrusion die or nozzle of a print head of an additive manufacturing system. The sensed pressure may be used to enhance reliability and performance of the system, or accuracy of part build.

Embodiments of the present disclosure may be used with any suitable layer-based additive manufacturing system that extrudes material. Additive manufacturing systems are typically much smaller in overall size than traditional melt extruders in the plastic or non-plastic extrusion industry.

Small size results in unique challenges when it relates to the desire to measure system pressure.

Figure 1:
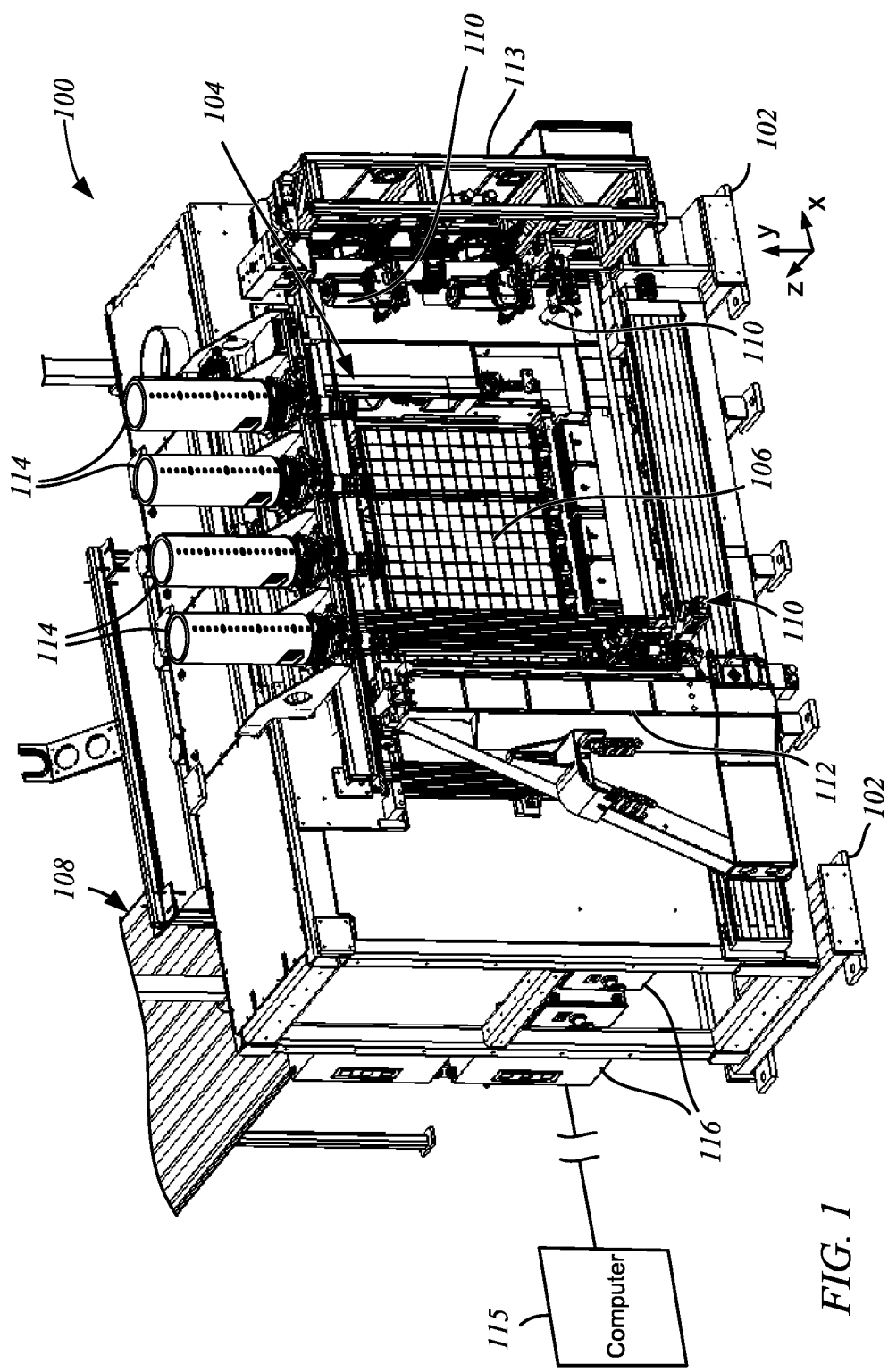
FIG. 1 is a block diagram of an additive manufacturing system in accordance with embodiments of the present disclosure.

FIG. 1 shows one such system 100, which is an exemplary manufacturing system for printing or otherwise building 3D part and their support structures using a layer-based, additive manufacturing technique. An exemplary system 100 is an extrusion-based additive manufacturing system where the print or z-axis is a substantially horizontal axis. In horizontal printing, movement of the 3D part and support is along the print axis that is substantially perpendicular to the print plane where the print axis is in a substantially horizontal direction and the print plane is substantially vertical.

Although a system for printing along a substantially horizontal print axis is shown in FIG. 1, embodiments described herein may also be used with extrusion-based additive manufacturing systems having a substantially vertical print axis. The direction of the print is not limiting and can have any suitable angular orientation between a substantially horizontal print axis and a substantially vertical print axis.

Additionally, embodiments of the present disclosure may be used with an additive manufacturing system having 3D toolpaths, rather than the traditional 2D toolpaths that extrude planar layers of the 3D part. Such systems make use of motion control systems including but not limited to articulated robotic arms for the positioning and traversing of the extruder and/or the positioning of the substrate. The use of robotic positioning systems can permit the extruder to deposit extruded material along non-planar, 3D toolpaths, using more complex manipulations, and can also eliminate the need for printing support structures.

Figure 2:
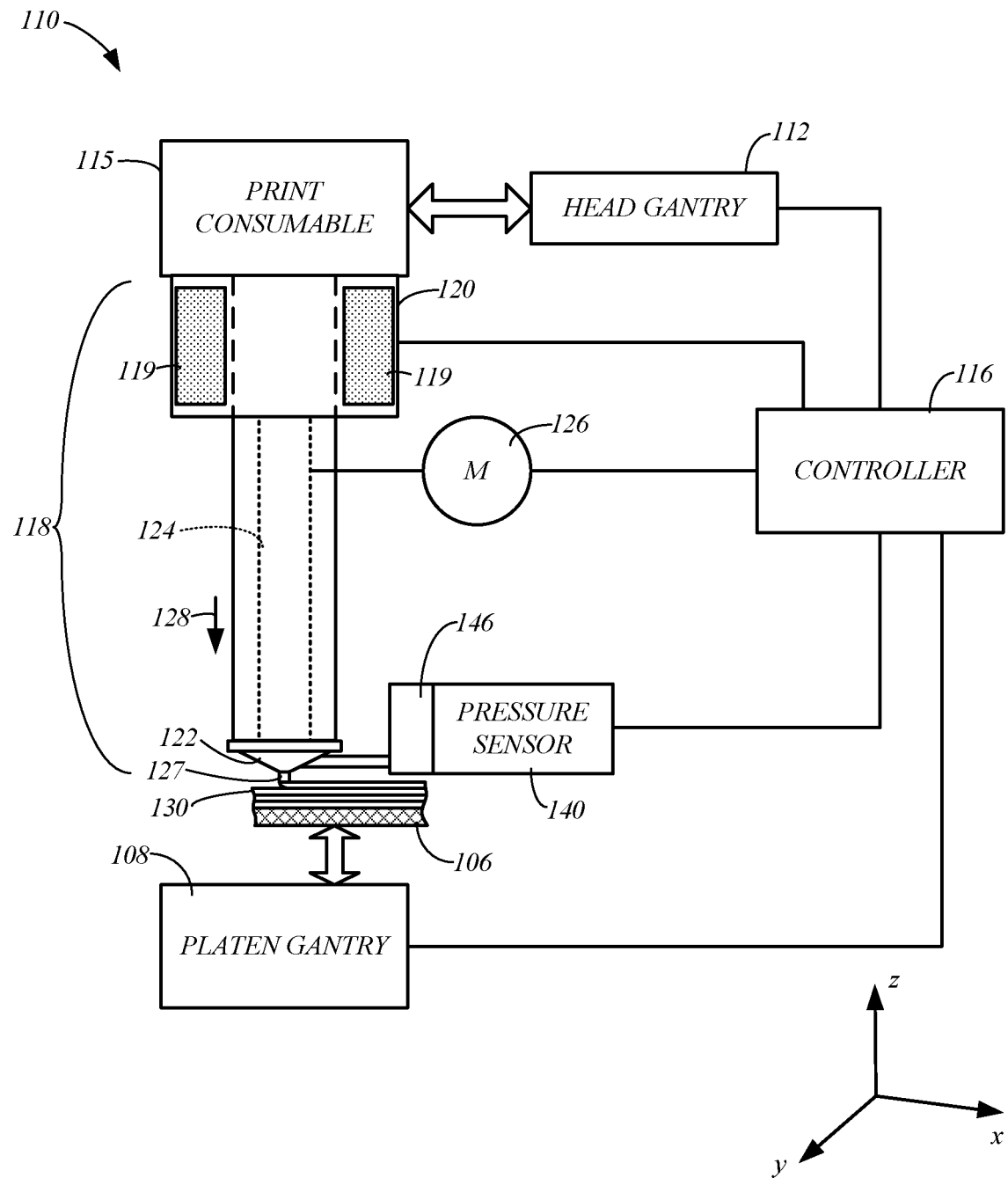
FIG. 2 is a simplified diagram of portions of an additive manufacturing system including an exemplary print head formed in accordance with embodiments of the present disclosure.

As shown in FIG. 1, the system 100 may rest on a table or other suitable surface 102, and include one or more of a chamber 104, a platen 106, a platen gantry 108, a print head 110, a head gantry 112, a tool changer 113, and consumable assemblies 114, for example. In some embodiments, chamber 104 is enclosed by chamber walls, and initially contains the platen 106. In some embodiments, the chamber 104 is heated and in some embodiments the chamber 104 is not heated. In some embodiments the system does not include a chamber, but rather prints 3D parts in ambient conditions, sometimes referred to as an out-of-oven printer. FIG. 2 is a simplified diagram of portions of the additive manufacturing system 100 including an exemplary print head 110 formed in accordance with embodiments of the present disclosure.

In some embodiments, the system 100 includes a controller 116, which represents one or more control circuits comprising one or more processors that are configured to monitor and operate the components of system 100 to perform one or more functions or method steps described herein. For example, one or more of the control functions performed by the controller 116 can be implemented in hardware, software, firmware, and the like, or a combination thereof. For example, the controller 116 may communicate with the print head 110 or components thereof, the chamber 104, heating devices, an actuator or drive mechanism of an extruder of the print head 110, various sensors, the platen gantry 108, the head gantry 112, calibration devices, display devices, and/or user input devices of the system 100 over suitable communication lines.

In some embodiments, the system 100, such as the controller 116, is configured to communicate with a computer or computer-based system 117 located with system 100, remote from the system 100, or integral with the system 100, such as an internal component of the system 100. In some embodiments, the computer 117 includes computer-based hardware, such as data storage devices, processors, memory modules and the like for generating and storing tool path and related printing instructions. The computer 117 may transmit these instructions to system 100 (e.g., to controller 116) to perform printing operations.

Exemplary consumable materials include filaments, powders or other suitable consumable materials. In some embodiments, the consumable materials are stored in the consumable assemblies 114 and provided in a batch process to a mobile hopper 115 integral with the print heads 110, such as is disclosed in U.S. Pat. No. 8,955,558. In some embodiments, the 3D parts are formed from a part consumable material contained in one of the consumable supplies 114, the support structures are formed of a sacrificial part material and/or support consumable material contained in one of the consumable supplies 114 for example.

In some embodiments, multiple print heads 110 are utilized to receive different consumable materials and discharge the molten or softened consumable materials, such as a molten resin, onto the platen to form layers of the 3D parts and support structures. In some embodiments, a single print head 110 is utilized, which may be interchangeable with a plurality of additional print heads 110 that may be stored, for example, within the tool changer 113. The different print heads 110 may be interchangeably used for depositing different materials or may be redundant where two or more print heads 110 are configured for use with the same consumable material. In one embodiment, the tool changer 113 holds three or more separate print heads 110.

During operation of the exemplary additive manufacturing system 100 shown in FIG. 1, the controller 116 may direct the print head 110 to pressurize and melt successive amounts of the consumable materials provided from the hopper 115. In other embodiments, in which the filament consumable is provided in the consumable assemblies 114, the controller 116 may direct the print head 110 to draw and melt successive segments of filament. The print head 110 includes an extruder 118. In some embodiments, the extruder 118 includes more heating elements 119, which form a liquefier 120, or an extruder/melt screw, that thermally melts the received consumable materials such that the materials become molten and flowable. While illustrated as being located at a proximal end of the extruder 118, the liquefier 120 may extend along the length of the extruder 120.

The print head 110 is supported by the head gantry 112, which in the exemplary embodiment is a gantry assembly configured to move the print head 110 along toolpaths in (or substantially in) the x-y plane, which is substantially parallel to a top surface of the platen 106 and substantially perpendicular to the build plane. In alternative embodiments, the head gantry may be a gantry assembly configured to move the print head 110 in 2D or 3D tool paths above platen 16 in any suitable spatial motion, including gantry positioning to any coordinate location in the workspace, and/or pitch-yaw-roll motions. The molten consumable materials are extruded and deposited from print head 110 onto a receiving surface of the current structure (i.e., item or part, support structure) as the head gantry 112 moves the print head 110 to print a part structure along a tool path.

Optionally, the print head 110 may initially print one or more layers of support structure onto the receiving surface of the platen 106 or onto a removable substrate adhered to platen 106 to provide a base for the subsequently printed layers. This maintains good adhesion between the layers of a 3D part and a build sheet secured to the platen 106, and reduces or eliminates any tolerance to flatness between the receiving surface of the platen 106 and the x-y build plane.

After the support structure is initially printed, the print head 110 may then print layers of the 3D part and/or support structures. Printing is performed in this embodiment in a z-direction.

In some embodiments, the extruder 118 includes a nozzle 122 for extruding the molten consumable material extrudate, as shown in FIG. 2. The molten consumable material is driven by a drive mechanism or actuator 124 of the extruder 118, which in turn is driven by a motor 126 through a suitable arrangement (e.g., gears, belts, etc.) based on speed commands sent by the controller 116. The drive mechanism 124 drives the molten, pressurized consumable material through the extruder 118 and a nozzle tip 127 of the nozzle 122 in the direction indicated by arrow 128, as shown in FIG. 2. The molten consumable material is discharged from the nozzle 122 as an extrudate 130 that forms a layer of the 3D part and/or support structure on the platen 106. In some embodiments, the drive mechanism 124 includes a screw or impeller that is rotated by the motor 126. One exemplary impeller-driven viscosity pump extruder is disclosed in U.S. Pat. No. 7,891,964. In some embodiments, the drive mechanism 124 includes a gear pump that is driven by the motor 126. One exemplary gear pump extruder is disclosed in Hjelsand et al. WO 2016/014543A1. In some embodiments, the drive mechanism is a filament drive that engages a strand of filament and feeds in into a liquefier tube, such as is disclosed in U.S. Pat. No. 6,004,124. In such filament-fed liquefier tube embodiments, the melted portion of filament provides a viscosity-pump action to pressurize and extrude the molten filament material through the extruder nozzle. Other configurations for the extruder may also be used.

Figure 3:
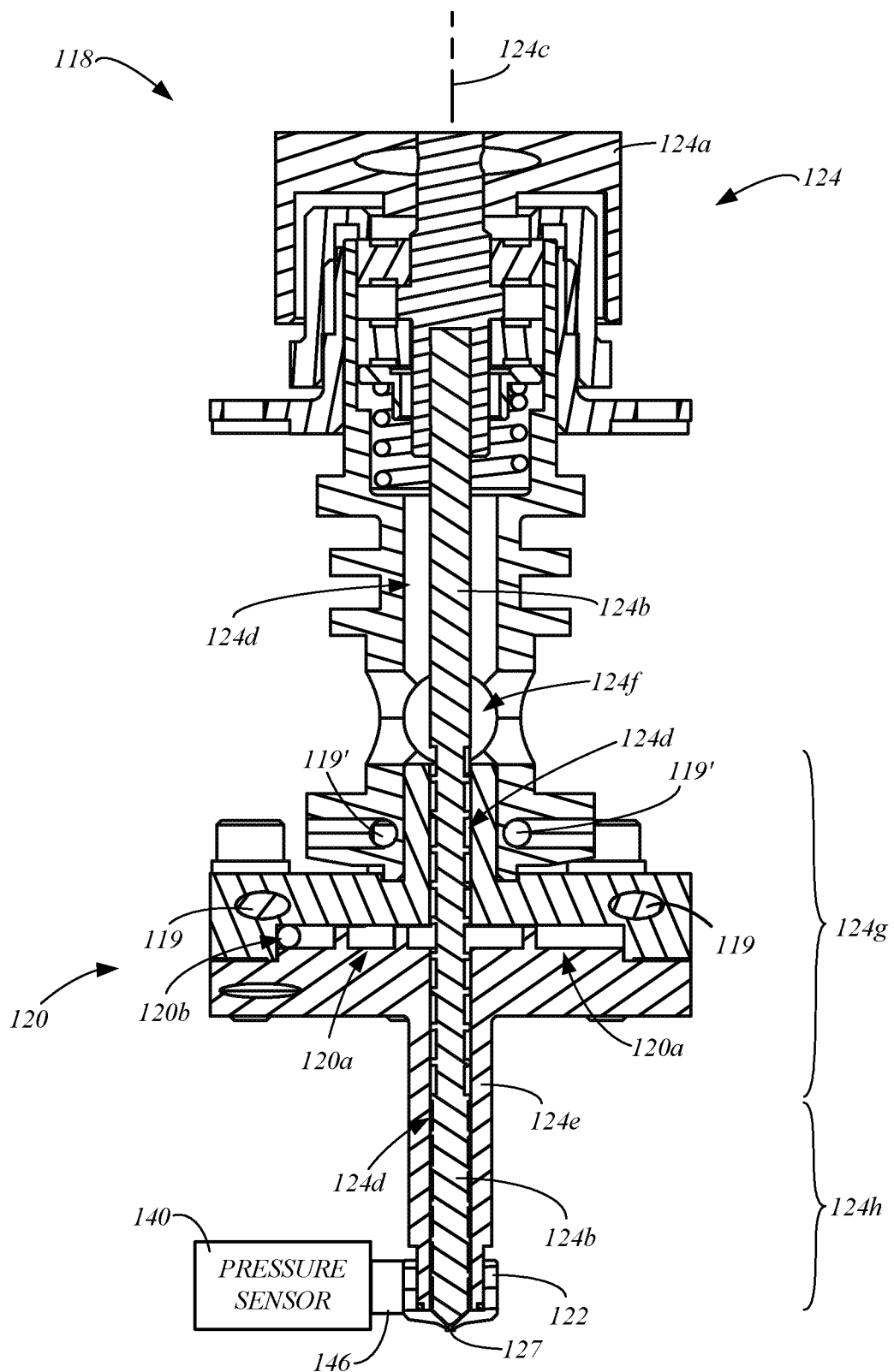
FIG. 3 is a cross-sectional view of an exemplary screw extruder in accordance with embodiments of the present disclosure.

FIG. 3 is a cross-sectional view of an exemplary screw extruder 118 in the form of a filament-fed viscosity pump, of the type disclosed in U.S. Pat. No. 7,891,964, in accordance with embodiments of the present disclosure. In some embodiments, the screw extruder 118 includes an embodiment of drive mechanism 124 having a drive component 124a, such as a gear or belt pulley, which may be driven by the motor 126 (FIG. 2) through a suitable arrangement, such as a belt, gears or other suitable arrangement. The drive component 124a is attached to a screw or impeller 124b, which is supported for rotation about an axis 124c within a barrel 124d of a housing 124e. The outer diameter of the impeller 124b closely matches the diameter of the barrel 124d, at least within the housing 124e and the liquefier 120. The impeller 124b has a plurality of spiral grooves cut in its outer surface that form a viscosity pump with the barrel 124d.

In some embodiments, the liquefier 120 includes a liquefier cavity 120a that is connected to a feed channel 120b. The liquefier 120 melts successive portions of solid consumable material that enter the cavity 120a through the channel 120b. The embodiment shown in FIG. 3 is configured to receive consumable material in the form of a flexible filament. It should be understood, however, that consumable material may be provided to other embodiments of a screw extruder as pellets, slugs, ribbon, or other shapes, each in accordance with the present invention. Heating elements 119 thermally melt the received consumable material to a desired flowable viscosity.

In the shown embodiment of FIG. 3, the screw extruder 118 includes heating elements 119' between the liquefier 120 and a vent 124f. The heating elements 119' prevent the flowable material from solidifying within the barrel 124d. This is desirable so that the meniscus of the flowable material rises and falls within the barrel 124d, thereby providing a decoupling function during momentary imbalances in the rate at which the solid consumable material is fed through the channel 120b and the rate at which the molten consumable material is fed by the impeller 124b of the screw extruder 118.

During operation, the solid consumable material is fed into the liquefier cavity 120a and is melted to a desired flowable viscosity. As successive portions of the solid consumable material continue to feed into liquefier cavity 120a, the solid consumable material travels circumferentially inwards (i.e., in a spiral manner) while melting. The melted, flowable material eventually reaches a transport zone 124g of the impeller 124b, where the rotation of impeller 124b drives the flowable material into a pressurizing zone 124h of the impeller 124b. Portion 124h of impeller 124b increases the pressure of the flowable material, and extrudes the flowable material out through an orifice at the nozzle tip 127. The extrusion rate of the flowable material may then be controlled by the rotation rate of impeller 124b (which corresponds to the driving power of drive motor 126). The extruded material is deposited in a desired pattern to form a 3D part and/or support structure on the platen 106, as shown in FIG. 2. The print head 110 further comprises a pressure sensor 140 configured to sense the pressure at the extruder nozzle 122. The sensed pressure by sensor 140 is indicative of flow rate of the extrudate, and therefore providing an indirect measurement of volumetric flow rate of the material as it is extruded.

Figure 4:
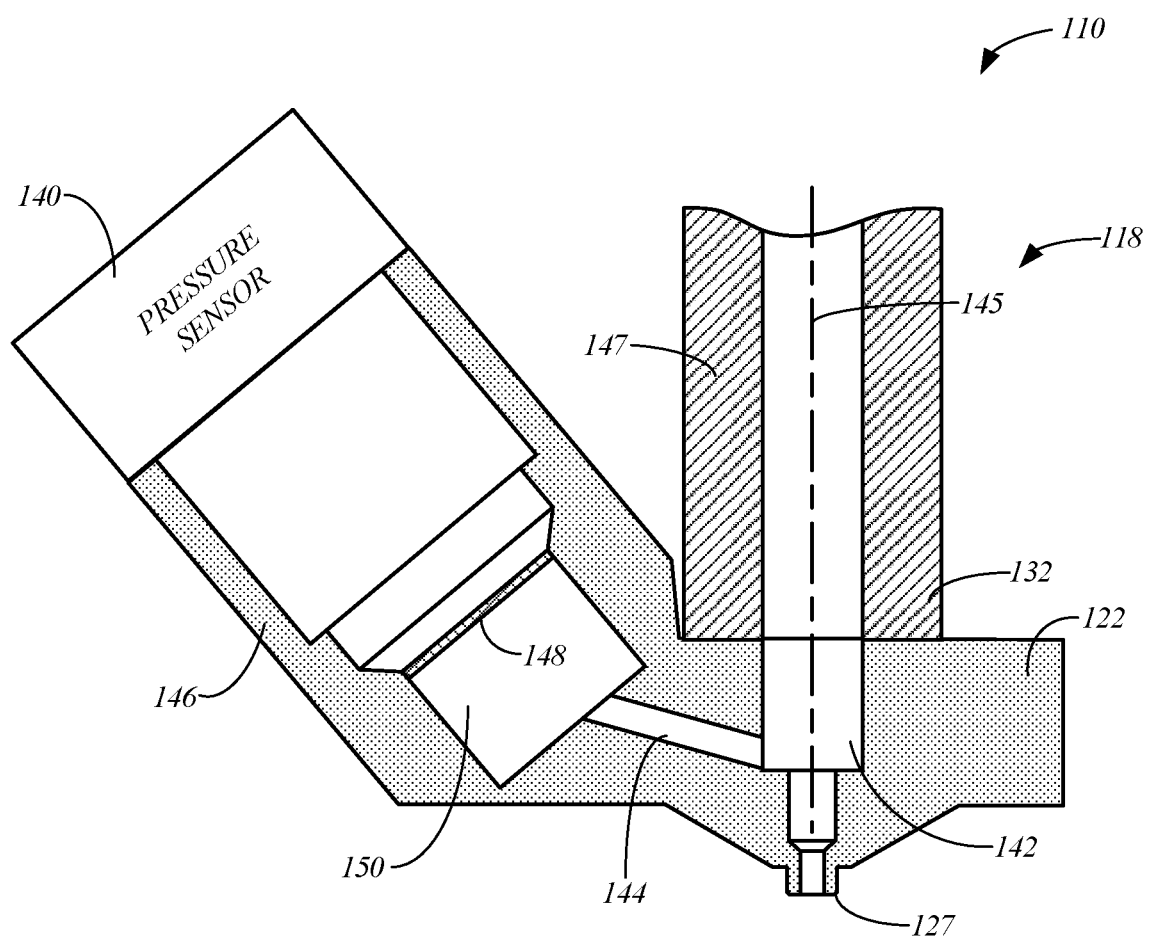
FIG. 4 is a simplified cross-sectional view of an end of a print head formed in accordance with exemplary embodiments of the present disclosure.

FIG. 4 is a simplified cross-sectional view of a nozzle end of an exemplary print head 110 formed in accordance with embodiments of the present disclosure. The drive mechanism 124 is not shown to simplify the illustration. The nozzle 122 is attached to a distal end 132 of the extruder 118 and discharges the extrudate through the small-diameter nozzle tip 127 of the nozzle 122 at a desired road width. The nozzle tip 127 may have any suitable diameter, however, the embodiments of the present disclosure are particularly useful for extruders having a narrow feed channel and small diameter nozzle tips 134. Exemplary, non-limiting inner tip diameters for the nozzle tip 127 include diameters up to about 760 micrometers (about 0.030 inches), and more preferably range from about 125 micrometers (about 0.005 inches) to about 510 micrometers (about 0.020 inches). In some embodiments, nozzle tip 127 may include one or more recessed grooves to produce roads having different road widths, as disclosed in Swanson et al., U.S. Patent Application Publication No. 2014/0048969.

The flow rate of the extrudate 130 is based in large part on the pressure within the nozzle 122, which is dependent on the rate at which the drive mechanism 124 drives the molten consumable material through the extruder 118 and into the nozzle 122. In some embodiments, the controller 116 controls the speed at which the drive mechanism 124 drives the molten consumable material through the extruder 118 in a closed-loop manner based on pressure measurements from within the nozzle 122 using a pressure sensor 140, which is shown schematically in FIGS. 2 and 3. This allows the controller 116 to compensate for pressure variations within the nozzle 122, thereby allowing for more precise control of the extrudate flow rate through the nozzle 122. This feedback control can assist in reducing response time delays, and improving part quality and material flow rates.

In some embodiments, the pressure sensor 140 is configured to sense a pressure of molten consumable material prior to its discharge through the nozzle 122. In some embodiments, the pressure sensor 140 is configured to sense a pressure of the molten consumable material within an interior cavity 142 of the nozzle 122. A port 144 extends between the interior cavity 142 of the nozzle 122 and the pressure sensor 140, or an interface 146 for the pressure sensor 140, to fluidically couple the pressure sensor 140 or the interface 146 to the interior cavity 142 of the nozzle 122. The pressure within the interior cavity 142 of the nozzle 122 is detected by the pressure sensor 140 through the interface 146.

For example, the port 144 may extend between the interior cavity 142 and the pressure sensor 140 or interface 146, as illustrated in FIG. 2, to fluidically couple the pressure sensor 140 or the interface 146 to the interior cavity 142. The pressure within the interior cavity 142 of the nozzle 122 is detected by the pressure sensor 140 through the interface 146. In typical extrusion applications, the port 144 may fluidically couple an interior cavity 147 of the extruder 118 to the pressure sensor 140 or interface 146, to allow the pressure sensor 140 to detect the pressure within the cavity 147; however, this pressure reading would fluctuate, and is only a reflection of the pressure somewhere within the cavity 147, and does not necessary reflect the pressure at the die exit. In accordance with embodiments of the present disclosure, the pressure sensor 140 is positioned to detect pressure in the nozzle 122 in order to meet the need for precisely controlled melt flows at fast response times during 3D printing operations, such as during the creation of net-shaped and near net-shaped parts. While the port 144 is illustrated as fluidically coupling the nozzle cavity 142 to the pressure sensor 140 or interface 146, it is understood that embodiments of the present disclosure include the use of the port 144 to fluidically couple the pressure sensor 140 or interface 146 to other locations within the nozzle 122.

The pressure sensor 140 may comprise any suitable pressure sensing device. For example, the pressure sensor may include a piezoresistive strain gauge pressure sensor, a capacitive pressure sensor, an electromagnetic pressure sensor, a piezoelectric pressure sensor, an optical pressure sensor, a potentiometric pressure sensor, or other suitable pressure sensing device.

In some embodiments, the interface 146 is integrally formed with the nozzle 122. In some embodiments, the interface 146 and nozzle are formed of metal. In some embodiments, the interface 146 is offset in a radial direction from an axis 145 of the nozzle 122 or the extruder 118 (e.g., axis 124c in FIG. 3), as shown in FIG. 4.

In some embodiments, the pressure sensor 140 and/or the interface 146 includes a diaphragm 148 that seals an interface cavity 150 of the interface 146 and the port 144.

In some embodiments, the cavity 150 has a volume of 0.0001 cubic inches to 0.0002 cubic inches. In one exemplary embodiment, the port 144 has a length and a diameter, and a ratio of the length to the diameter is approximately 3. Other length-to-diameter ratios may also be used. In some embodiments, the port 144 has a diameter less than approximately 0.032 inches.

The disclosed geometry maintains the polymeric material in a molten form when being extruded and quick heats to a molten state when starting an extrusion process.

In some embodiments, molten consumable material flows from the cavity 142 of the nozzle 122 through the port 144 and fills the cavity 150. Pressure within the cavity 142 of the nozzle 122 is communicated to the cavity 150 through the molten consumable material. In some embodiments, the diaphragm 148 deforms in response to the pressure within the cavities 142 and 150. This deformation is sensed by the pressure sensor 140 to determine the pressure within the cavity 142 using a suitable pressure sensing device, such as one of those mentioned above.

In some embodiments, the diaphragm 148 is a component of the pressure sensor 140. Thus, the attachment of the pressure sensor 140 to the interface 146 seals the port 144. In some embodiments, the interface 146 includes the diaphragm. This allows the pressure sensor 140 to be removed or replaced without breaking the seal of the port 144.

It would be desirable to mount the pressure instrumentation sensor directly to the nozzle tip volume 142. However, in additive manufacturing systems that extrude precise roads of material in dynamic motion along toolpaths, the extruder nozzle/liquefier tip is typically much smaller than the instrumentation to be used. That is, the commercially-available pressure sensor instrumentation is too large to allow its placement in the nozzle of a precision extruder for 3D printing. Also, attachment of the sensor directly to the barrel will result in measurement of the pressure within the extruder barrel or screw, which will not be the same as the pressure reading needed at the extruder exit. Embodiments of the present disclosure solve this problem by creating side ports through which melted consumable material in the flow channel may access the instrumentation.

Design and volume of the entire pressure port cavity in such a small system must be made carefully to avoid issues. The two key volumetric aspects of the sensor port relate to the volume of the port 144 and the volume of the cavity 150. The diameter of the pressure sensor 140 has a minimum size that is limited by the commercially available options for pressure sensors. From a volume perspective, there must be enough volume of molten consumable material to provide an adequate representation of the pressure within the cavity 142 of the nozzle 122 or the pressure just before the molten consumable material passes out of the nozzle tip 127. However, there cannot be too large a volume of consumable material, or it will contract upon cooling and impart under-pressurization to the pressure sensor. Also, there cannot be too little volume of consumable material, or consumable material degradation in the port will result upon initial heat-up of the system.

When the length of the port 144 is made too long or the diameter too narrow, such as when the port 144 is separate and distinct from the cavity 142, then the consumable material may not remain in a molten state and may cool and solidify in the port 144, which can adversely affect the accuracy of the pressure readings by the sensor 140. When the diameter of the port 144 is too large, then too much consumable material recirculation may result, allowing stagnant material to mix with the current process material in significant amounts.

During a print operation, the drive mechanism 124 of the extruder 118 drives molten consumable material into the nozzle 122. The molten consumable material fills the cavities 142 and 150, and is extruded through the nozzle tip 127 as the extrudate 130 to form cross-sectional layers of a 3D part and/or support structure on the platen 106. The controller 116 receives a signal from the pressure sensor 140 that is indicative of the pressure within the cavity 142. The signal may be communicated to the controller 116 using one or more electrical, optical, and/or wireless communication lines, to relay pressure measurements in a real-time manner. The controller 116 uses the signal from the pressure sensor 140 to control the feeding of the molten consumable material by the drive mechanism 124 including providing flow control feedback to improve the printing of the accuracy at which the layers are printed, and/or provide other improvements or functions. The cavity 150 and the port 144 are configured to prevent clogging by maintaining the interface 146 structure at a temperature that maintains the molten state of the consumable material during printing operations.

As can be seen from the above-discussion, the pressure within the nozzle 122 may be operably measured, allowing the controller 116 to adjust the feeding of the molten consumable material through the extruder 118 and the nozzle 122 in response to the measured pressure to control the flow rate of the extrudate 130 in a closed-loop manner. This is particularly suitable for compensating for the unpredictability of changes in the flow of the consumable material, which can improve response times during printing operations.

Although the present disclosure has been described with reference to preferred embodiments, workers skilled in the art will recognize that changes may be made in form and detail without departing from the spirit and scope of the disclosure.

What is claimed is:

1. An additive manufacturing system for printing three-dimensional parts in a layer-by-layer manner, the system comprising:
    an extruder comprising:
        a drive mechanism configured to feed a molten consumable material;
        a nozzle comprising:
            a nozzle tip through which the molten consumable material is discharged as an extrudate;
            a port fluidically coupling a pressure interface to the interior cavity of the nozzle, wherein the pressure interface is fluidically coupled to the port; and
        a pressure sensor configured to operably measure a pressure within the interior cavity of the nozzle through the pressure interface wherein the sensed pressure is correlated to a volumetric flow rate of the extrudate and wherein the sensor is configured to provide feed back to the drive mechanism to correct volumetric flow errors of the extrudate.

2. The system according to claim 1, wherein the pressure interface is integral with the nozzle.

3. The system according to claim 1, wherein the pressure interface is radially offset from an axis of the nozzle tip.

4. The system according to claim 1, wherein the pressure interface includes an interface cavity that is fluidically coupled to the interior cavity of the nozzle through the port.

5. The system according to claim 4, wherein the interface cavity has a volume of 16.39 cubic millimeters (0.001 cubic inches) to 32.77 cubic millimeters (0.002 cubic inches) such that an entire area of the pressure interface is wetted by the consumable material, wherein the pressure interface is at a depth of at least 0.25 millimeters (0.010 inches) within the port from the interior cavity.

6. The system according to claim 5, wherein the port has a diameter and a length, and a ratio of the length to the diameter is less than 3.

7. The system according to claim 4, wherein the pressure interface comprises a diaphragm that is configured to deform in response to changes in the pressure within the interior cavity of the nozzle.

8. The system according to claim 7, wherein the system further comprises:
    a platen configured to support the extrudate discharged through the nozzle tip;
    a print head comprising the nozzle; and
    a head gantry configured to move the print head relative to the platen.

9. The system according to claim 8, further comprising a controller configured to adjust feed rates of the consumable material through the extruder based on the measured pressure to control a material flow rate of the extrudate through the nozzle tip in a closed-loop manner.

10. A method for printing a three-dimensional part with an additive manufacturing system, the method comprising:
    heating a consumable material to a molten state;
    feeding the molten consumable material through an extruder;
    filling an interior cavity of a nozzle with the molten consumable material and discharging the molten consumable material as an extrudate through a nozzle tip of the nozzle in response to feeding the molten consumable material;
    fluidically coupling the interior cavity of the nozzle to a pressure interface through a port;
    operably measuring a pressure within the interior cavity of the nozzle through the pressure interface using a pressure sensor wherein the sensed pressure is correlated to a volumetric flow rate; and
    adjusting a feed rate of the consumable material through the extruder in response to the measured pressure to control the volumetric flow rate of the extrudate through the nozzle tip in a closed-loop manner using a controller.

11. The method according to claim 10, wherein measuring a pressure within the interior cavity of the nozzle includes communicating the pressure in the interior cavity of the nozzle to the pressure interface through a port.

12. The method according to claim 11, wherein communicating the pressure in the interior cavity of the nozzle to the pressure interface includes filling the port with the molten consumable material.

13. The method according to claim 12, wherein:
    the pressure interface includes an interface cavity fluidically coupled to the interior cavity of the nozzle through the port; and
    communicating the pressure in the interior cavity of the nozzle to the pressure interface includes filling the interface cavity with the molten consumable material through the port.

14. The method according to claim 13, wherein operably measuring the pressure within the interior cavity of the nozzle comprises deforming a diaphragm at the pressure interface in response to changes in pressure within the interior cavity of the nozzle.

15. The method according to claim 14, further comprising moving a print head comprising the nozzle relative to a platen during discharging the molten material as an extrudate through the nozzle tip, and supporting the extrudate on the platen.

16. An additive manufacturing system for printing three-dimensional parts in a layer-by-layer manner, the system comprising:
    an extruder comprising:
        a drive mechanism configured to feed a molten consumable material;
        a nozzle comprising:
            a nozzle tip through which the molten consumable material is discharged as an extrudate;
            a port fluidically coupling a pressure interface to the interior cavity of the nozzle, wherein the pressure interface is fluidically coupled to the port;
        a pressure sensor configured to operably measure a pressure within the interior cavity of the nozzle through the pressure interface; and
        a controller configured receive a signal from the pressure sensor related to the measured pressure, wherein the controller is configured to correlate a volumetric flow rate for the extrudate to the measured pressure, wherein the controller is configured to send a signal to the extruder to adjust feed rates of the consumable material through the extruder based on the measured pressure to control a material flow rate of the extrudate through the nozzle tip in a closed-loop manner.

17. The additive manufacturing system of claim 16, wherein the pressure interface is integral with the nozzle.

18. The additive manufacturing system of claim 16, wherein the pressure interface is radially offset from an axis of the nozzle tip.

19. The additive manufacturing system of claim 16, wherein the pressure interface includes an interface cavity that is fluidically coupled to the interior cavity of the nozzle through the port.

* * * * *